(12) United States Patent
Kunieda et al.

(10) Patent No.: US 10,821,358 B2
(45) Date of Patent: Nov. 3, 2020

(54) GAMING SERVER AND METHOD TO GENERATE CONTEXT-AWARE GAMING INFORMATION

(71) Applicant: Sony Interactive Entertainment LLC, San Mateo, CA (US)

(72) Inventors: Shunsuke Kunieda, San Francisco, CA (US); Wivat Kruawongwanich, San Francisco, CA (US); Erika Ohno, San Francisco, CA (US)

(73) Assignee: SONY INTERACTIVE ENTERTAINMENT NETWORK AMERICA LLC, San Mateo, CA (US)

( * ) Notice: Subject to any disclaimer, the term of this patent is extended or adjusted under 35 U.S.C. 154(b) by 266 days.

(21) Appl. No.: 15/356,173

(22) Filed: Nov. 18, 2016

(65) Prior Publication Data

US 2018/0140947 A1    May 24, 2018

(51) Int. Cl.
  *A63F 13/35* (2014.01)
  *A63F 13/86* (2014.01)
  *A63F 13/537* (2014.01)
  *A63F 13/79* (2014.01)

(52) U.S. Cl.
  CPC ............ *A63F 13/35* (2014.09); *A63F 13/537* (2014.09); *A63F 13/79* (2014.09); *A63F 13/86* (2014.09)

(58) Field of Classification Search
  CPC ........ A63F 13/35; A63F 13/537; A63F 13/79; A63F 13/86
  USPC ....................................................... 463/1, 31
  See application file for complete search history.

(56) References Cited

U.S. PATENT DOCUMENTS

| 8,303,415 | B2 | 11/2012 | Craine et al. |
| 8,425,331 | B2 | 4/2013 | Bortnik et al. |
| 8,469,805 | B2 | 6/2013 | Kilgore et al. |

(Continued)

FOREIGN PATENT DOCUMENTS

| JP | 2008-546469 | 12/2008 |
| WO | 2012155144 A1 | 11/2012 |

OTHER PUBLICATIONS

Extended European Search Report in Application No. 17871586.8, (11 pp.), dated Apr. 22, 2020.

(Continued)

*Primary Examiner* — Jay Trent Liddle
*Assistant Examiner* — Ryan Hsu
(74) *Attorney, Agent, or Firm* — Chip Law Group (57) ABSTRACT

A gaming server and method for generating context-aware gaming information are disclosed, which includes receipt of a view request from a first gaming device associated with a first user, by the gaming server. The view request includes a request to view a gaming profile of a second user. Based on the received view request, one or more circuits of the gaming server detects an entry point event from a plurality of defined entry point events to access the gaming profile of the second user. The one or more circuits are configured to generate context-aware gaming information of the second user based on the detected entry point event on the first gaming device. Further, a display of the generated context-aware gaming information within the gaming profile of the second user may be controlled on the first gaming device, based on the received view request.

20 Claims, 7 Drawing Sheets

(56) References Cited

U.S. PATENT DOCUMENTS

| | | | |
|---|---|---|---|
| 8,825,802 B2* | 9/2014 | Pearce | G07F 17/32 |
| | | | 709/218 |
| 8,856,268 B2 | 10/2014 | Chen et al. | |
| 9,289,686 B2 | 3/2016 | Hall et al. | |
| 2001/0034262 A1* | 10/2001 | Banyai | A63F 3/081 |
| | | | 463/17 |
| 2004/0018876 A1* | 1/2004 | Kubota | A63F 13/12 |
| | | | 463/42 |
| 2006/0135264 A1 | 6/2006 | Shaw et al. | |
| 2006/0287096 A1 | 12/2006 | O'Kelley, II et al. | |
| 2011/0045912 A1 | 2/2011 | Bortnik et al. | |
| 2012/0108309 A1* | 5/2012 | Aoki | G07F 17/3227 |
| | | | 463/13 |
| 2013/0244793 A1 | 9/2013 | Bortnik et al. | |
| 2013/0310163 A1 | 11/2013 | Smith et al. | |
| 2013/0346875 A1 | 12/2013 | Klein et al. | |
| 2015/0352444 A1* | 12/2015 | Smith | A63F 13/46 |
| | | | 463/31 |
| 2016/0092088 A1 | 3/2016 | Doyle et al. | |
| 2016/0093154 A1* | 3/2016 | Bytnar | G07F 17/3218 |
| | | | 463/25 |

OTHER PUBLICATIONS

Anonymous, "Landing Page—Wikipedia," (Nov. 11, 2016), XP055683792, Retrieved from the Internet: URL:https://en.wikipedia.org/w/index.php?title=Landing_page&oldid=748976830 [retrieved on Apr. 7, 2020], pp. 1-2.

Japanese Office Action in Application No. 2019-524410, 7 pp (including translation), dated Jun. 23, 2020.

* cited by examiner

FIG. 5

GAMING SERVER AND METHOD TO GENERATE CONTEXT-AWARE GAMING INFORMATION

CROSS-REFERENCE TO RELATED APPLICATIONS/INCORPORATION BY REFERENCE

None

FIELD

Various embodiments of the disclosure relate to a gaming system. More specifically, various embodiments of the disclosure relate to a gaming server and method to generate context-aware gaming information in an online gaming environment.

BACKGROUND

With the advent of digital convergence in the field of online gaming system, it has become possible to facilitate communication between various gaming devices that support different computing and information technologies. In certain scenarios, such a digital convergence may facilitate a typical two-party, command-response interaction between the various devices communicatively coupled with each other. In such a command-response interaction, a first party, such as a gaming device, a client, or an initiator, may initiate an interaction by issuance of a command in response to an input provided by a player. A second party, such as a gaming server, or a responder, may complete the interaction by providing an appropriate response to the communicated request. However, in such scenarios, the interaction may be limited to a response that typically corresponds to the requested item as that of the issued command. Such an interaction may sound robotic, as it fails to mimic intelligent human-like or intuitive responses. Consequently, such an interaction may not enable the various devices to eloquently converse with the players in an online gaming environment.

Further limitations and disadvantages of conventional and traditional approaches will become apparent to one of skill in the art, through comparison of described systems with some aspects of the present disclosure, as set forth in the remainder of the present application and with reference to the drawings.

SUMMARY

A gaming server and method to generate context-aware gaming information is provided substantially as shown in, and/or described in connection with, at least one of the figures, as set forth more completely in the claims.

These and other features and advantages of the present disclosure may be appreciated from a review of the following detailed description of the present disclosure, along with the accompanying figures in which like reference numerals refer to like parts throughout.

DETAILED DESCRIPTION

Various implementations may be found in a gaming server and method to generate context aware gaming information in an online gaming environment. Exemplary aspects of the disclosure may comprise an information processing method implemented in a gaming server, which includes one or more circuits. The one or more circuits may be communicatively coupled to a plurality of gaming devices. The one or more circuits may receive a view request from a first gaming device associated with a first user. The received view request may comprise a request to view a gaming profile of a second user associated with a second gaming device of the plurality of gaming devices. The information processing method may further detect an entry point event from a plurality of defined entry point events to access the gaming profile of the second user, based on the received view request. The detected entry point event may indicate one or more activities of the first user on the first gaming device prior to the display of the gaming profile of the second user. Context aware gaming information associated with the second user may be generated based on the detected entry point event. The information processing method may control display of the generated context aware gaming information on the first gaming device based on the received view request. The context aware gaming information may be provided within the gaming profile of the second user.

In accordance with an embodiment, user-activity information of the first user may be extracted from a storage device of the gaming server. The user-activity information of the first user on the first gaming device may be extracted for an elapsed time period prior to the detected entry point event, based on the received view request. The user-activity information of the first user may correspond to an in-game related action, a now playing-related action, a game related action, a shared media-related action, a friend-related action, and a community-related action.

The plurality of defined entry point events may correspond to different user interface (UI) elements of one or more UIs rendered on the first gaming device. The different UI elements may lead to the gaming profile of the second user. Contextual information may also be extracted from the gaming profile of the second user for the generation of the context aware gaming information. The extraction of the contextual information from the gaming profile of the second user may be executed based on the detected entry point event. The extracted contextual information may include an overview of the gaming profile of the second user, one or more games played by the second user, one or more gaming achievements, shared media content, and one or more friends and communities of the second user.

The generated context aware gaming information along with the gaming profile of the second user may be communicated to the first gaming device. The communicated context aware gaming information and the gaming profile of the second user may be rendered on a same UI on a display screen of the first gaming device. The display of the generated context aware gaming information may be controlled based on the one or more activities of the first user associated with the detected entry point event.

Figure 1:
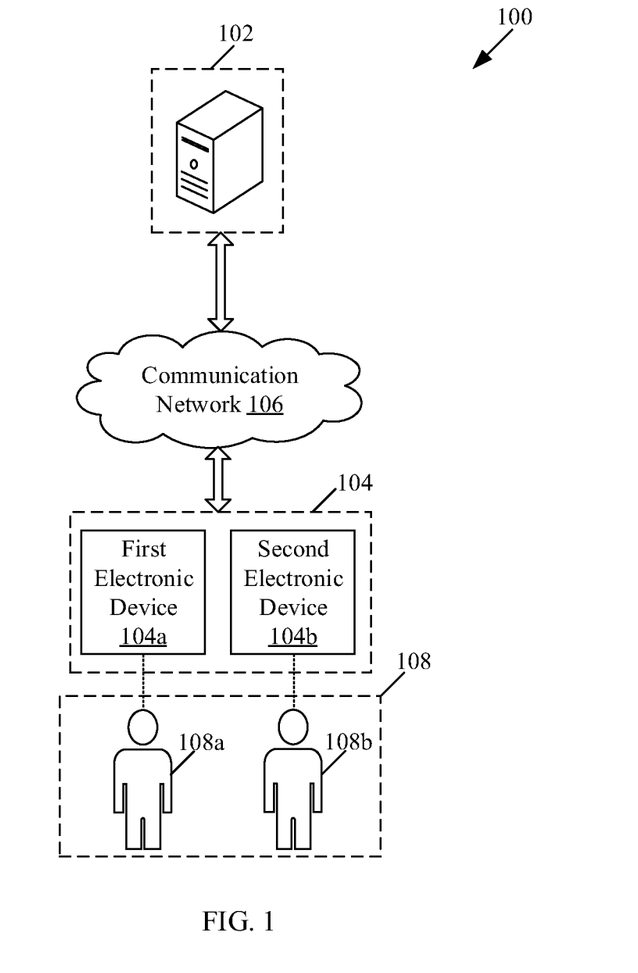
FIG. 1 is a block diagram that illustrates an exemplary network environment to generate context aware gaming information in an online gaming environment, in accordance with an embodiment of the disclosure.

FIG. 1 is a block diagram that illustrates an exemplary network environment to generate context aware gaming information in an online gaming environment, in accordance with an embodiment of the disclosure. With reference to FIG. 1, there is shown an exemplary network environment 100. The exemplary network environment 100 may include an information processing server, such as a gaming server 102. The exemplary network environment 100 may further include a plurality of gaming devices 104, such as a first gaming device 104a and a second gaming device 104b. With reference to FIG. 1, there is further shown a communication network 106. The plurality of gaming devices 104 may be communicatively coupled to the gaming server 102, via the communication network 106. A plurality of users 108, such as a first user 108a and a second user 108b, who are associated with the first gaming device 104a and the second gaming device 104b, respectively, are also shown.

The gaming server 102 may comprise suitable logic, circuitry, interfaces, and/or code that may be configured to communicate with the plurality of gaming devices 104, via the communication network 106. A plurality of entry points to access a gaming profile of a user associated with each of the plurality of gaming devices 104, may be defined in the gaming server 102. For example, the gaming server 102 may be configured to detect an entry point event from the plurality of defined entry point events to access the gaming profile of the second user 108b. The entry point event may be detected on the first gaming device 104a associated with the first user 108a. The gaming server 102 may be further configured to generate context aware gaming information associated with the second user 108b based on the detected entry point event. Examples of the gaming server 102 may include, but are not limited to, a cloud server, an application server, a database server, an online gaming server, a web server, and/or a combination thereof.

Each of the plurality of gaming devices 104 may comprise suitable logic, circuitry, interfaces, and/or code that may be configured to communicate with the gaming server 102, via the communication network 106. A user, such as the first user 108a, may utilize a gaming device, such as the first gaming device 104a, to perform one or more actions associated with one or more games in the online gaming environment. The first user 108a may utilize the first gaming device 104a to view the gaming profile of other users of the plurality of users 108, such as the second user 108b. Examples of the plurality of gaming devices 104 may include, but are not limited to, a video game console, a specialized desktop computer configured for gaming, a mobile device, such as a smart phone, a tablet computer, a web-enabled device, a laptop, a wearable electronic device, and/or other such computing devices.

The communication network 106 may include a communication medium through which the gaming server 102 may communicate with the plurality of gaming devices 104. The communication network 106 may be a wired or wireless communication network. Examples of the communication network 106 may include, but are not limited to, a Wireless Fidelity (Wi-Fi) network, a Local Area Network (LAN), a wireless personal area network (WPAN), a Wireless Local Area Network (WLAN), a wireless wide area network (WWAN), a cloud network, a Long Term Evolution (LTE) network, a plain old telephone service (POTS), a Metropolitan Area Network (MAN), and/or the Internet. Various devices in the exemplary network environment 100 may be configured to connect to the communication network 106, in accordance with various wired and wireless communication protocols. Examples of such wired and wireless communication protocols may include, but are not limited to, Transmission Control Protocol and Internet Protocol (TCP/IP), User Datagram Protocol (UDP), Hypertext Transfer Protocol (HTTP), File Transfer Protocol (FTP), ZigBee, EDGE, infrared (IR), IEEE 802.11, 802.16, Long Term Evolution (LTE), Light Fidelity (Li-Fi), and/or other cellular communication protocols or Bluetooth (BT) communication protocols, including variants thereof.

In operation, the gaming server 102 may receive a view request from one of the plurality of gaming devices 104, such as the first gaming device 104a associated with the first user 108a, via the communication network 106. The received view request may comprise a request to view a gaming profile of the second user 108b associated with the second gaming device 104b. The gaming server 102 may be configured to detect an entry point event from a plurality of defined entry point events to access the gaming profile of the second user 108b, based on the received view request. The plurality of entry points may be defined in the gaming server 102, which may be used to access the gaming profile of one or more other users, such as the second user 108b. The plurality of defined entry point events may correspond to different navigation paths by use of user interface (UI) elements of one or more UIs rendered on the first gaming device 104a. The different navigation paths may be defined that may lead to one particular UI, such as the gaming profile of a user (such as the second user 108b).

The gaming server 102 may receive and store user-activity information from the plurality of gaming devices 104. The user-activity information may correspond to one or more activities related to the gameplay of users on their respective gaming devices. The gaming server 102 may be configured to extract user-activity information of the first user 108a from a storage device of the gaming server 102. In accordance with an embodiment, the user-activity information may be extracted based on the received view request. The user-activity information of the first user 108a may be extracted for an elapsed time prior to the detected entry point event. In accordance with an embodiment, the detected entry point event may indicate one or more activities of the first user 108a on the first gaming device 104a prior to display of the gaming profile of the second user 108b. The detection of the entry point event is further described in detail, for example, in FIGS. 4A to 4E.

The gaming server 102 may be configured to extract contextual information from the gaming profile of the second user 108b. In accordance with an embodiment, the contextual information may include an overview of the gaming profile of the second user 108b. The contextual information may further include gaming information of one or more games associated with the second user 108b. The gaming information may include gaming achievements, total gameplay time, and shared media content associated with the one or more games. The contextual information may further include information of one or more friends and communities of the second user 108b in the online gaming environment. In accordance with an embodiment, the contextual information may be extracted from the gaming profile of the second user 108b based on the detected entry point event. The extraction of the contextual information is further described in detail, for example, in FIGS. 4A to 4E.

The gaming server 102 may be configured to generate context aware gaming information of the second user 108b based on the detected entry point event. The context aware gaming information of the second user 108b may be generated based on the extracted contextual information of the second user 108b. The gaming server 102 may be further configured to communicate the generated context aware gaming information along with the gaming profile of the second user 108b to the first gaming device 104a, via the communication network 106. The communicated context aware gaming information and the gaming profile of the second user 108b may be rendered on a same UI on the first gaming device 104a. The display of the generated context aware gaming information within the gaming profile of the second user 108b may be controlled. The display control of the generated context aware gaming information is further described in detail, for example, in FIGS. 4A to 4E.

Figure 2:
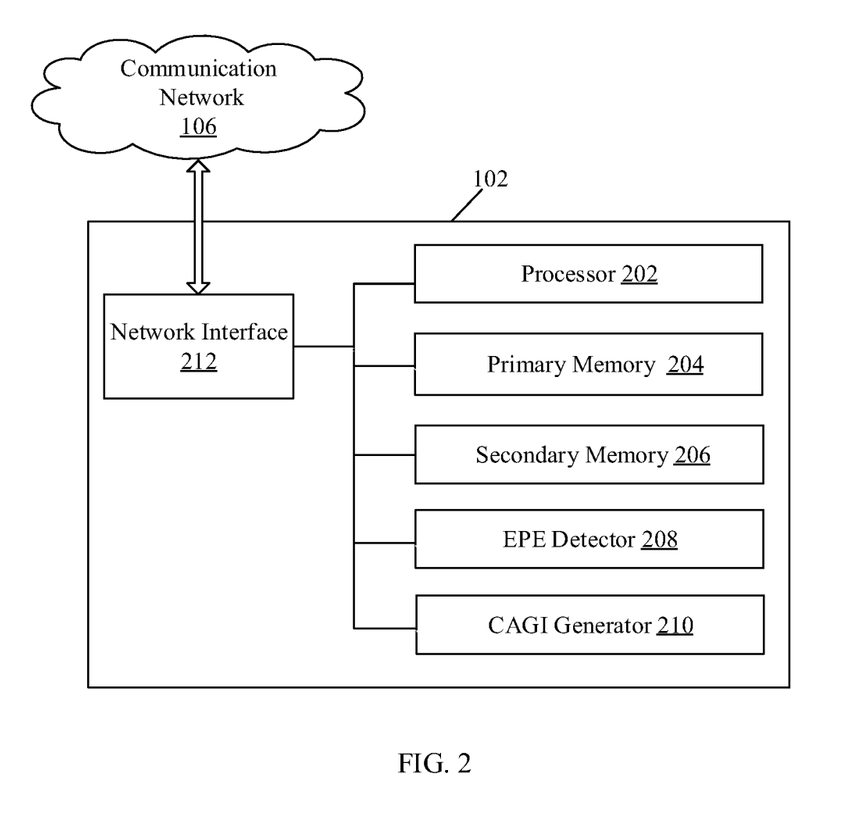
FIG. 2 is a block diagram that illustrates an exemplary gaming server to generate context aware gaming information in an online gaming environment, in accordance with an embodiment of the disclosure.

FIG. 2 is a block diagram that illustrates an exemplary gaming server to generate context aware gaming information in an online gaming environment, in accordance with an embodiment of the disclosure. FIG. 2 is described in conjunction with elements from FIG. 1. With reference to FIG. 2, there is shown a block diagram of an exemplary information processing server, such as the gaming server 102. The gaming server 102 may include one or more circuits, such as a processor 202, a primary memory 204, a secondary memory 206, an entry point event (EPE) detector 208, a context-aware gaming information (CAGI) generator 210, and a network interface 212. There is also shown the communication network 106 (FIG. 1).

In accordance with an embodiment, the processor 202 may be communicatively coupled to the primary memory 204, the secondary memory 206, the EPE detector 208, the CAGI generator 210, and the network interface 212. The network interface 212 may be configured to communicate with the plurality of gaming devices 104, via the communication network 106, under the control of the processor 202.

The processor 202 may comprise suitable logic, circuitry, interfaces, and/or code that may be configured to execute a set of instructions stored in the secondary memory 206. The processor 202 may be configured to permit the first user 108a to view the dynamically generated context-aware gaming information of the second user 108b on the first gaming device 104a. The processor 202 may be implemented based on a number of processor technologies, which are known in the art. Examples of the processor 202 may be an X86-based processor, a Reduced Instruction Set Computing (RISC) processor, an Application-Specific Integrated Circuit (ASIC) processor, a Complex Instruction Set Computing (CISC) processor, and/or other processors or control circuits.

The primary memory 204 may comprise suitable logic, circuitry, interfaces, and/or code that may be configured to temporarily store data, such as gaming profiles of various users, such as the first user 108a and the second user 108b. Examples of implementation of the primary memory 204 may include, but are not limited to, Random Access Memory (RAM), Dynamic Random Access Memory (DRAM), Static Random Access Memory (SRAM), Thyristor Random Access Memory (T-RAM), Zero-Capacitor Random Access Memory (Z-RAM), cache memory, and/or other volatile memory.

The secondary memory 206 may comprise suitable logic, circuitry, interfaces, and/or code that may be configured to store a machine code and/or a set of instructions executable by the processor 202, the EPE detector 208, and/or the CAGI generator 210. The secondary memory 206 may be configured to store one or more algorithms that are executed by the processor 202 to extract user-activity information of various users associated with the plurality of gaming devices 104. The secondary memory 206 may be configured to store one or more algorithms that are executed by the EPE detector 208 to detect an entry point event from a plurality of defined entry point events. The secondary memory 206 may be configured to store one or more algorithms that are executed by the CAGI generator 210 to generate the context-aware gaming information. The secondary memory 206 may be further configured to store operating systems and associated applications of the gaming server 102. Examples of implementation of the secondary memory 206 may include, but are not limited to, Read Only Memory (ROM), a flash memory, Hard Disk Drive (HDD), a Solid-State Drive (SSD), a Secure Digital (SD) card, and/or a removable media drive.

The EPE detector 208 may comprise suitable logic, circuitry, interfaces, and/or code that may be configured to detect the entry point event on the first gaming device 104a from the plurality of defined entry point events. The EPE detector 208 may detect the entry point event based on the received view request to access a single gaming profile of a user, such as the second user 108b. The EPE detector 208 may be implemented as a separate processor or special-purpose circuitry in the gaming server 102. The EPE detector 208 and the processor 202 may be implemented as an integrated processor or a cluster of processors that perform the functions of the EPE detector 208 and the processor 202. Alternatively, the EPE detector 208 may be implemented as a set of instructions stored in the secondary memory 206, which on execution by the processor 202 may perform the functions and operations of the gaming server 102.

The CAGI generator 210 may comprise suitable logic, circuitry, interfaces, and/or code that may be configured to generate the context-aware gaming information that may be different for different users and different entry point events. For example, the CAGI generator 210 may generate the context-aware gaming information associated with the second user 108b based on the detected entry point event on the first gaming device 104a associated with the first user 108a. The CAGI generator 210 may be implemented as a separate processor or circuitry in the gaming server 102. The CAGI generator 210 and the processor 202 may be implemented as an integrated processor or a cluster of processors that perform the functions of the CAGI generator 210 and the processor 202. The CAGI generator 210 may be implemented as a set of instructions stored in the secondary memory 206, which on execution by the processor 202 may perform the functions and operations of the gaming server 102.

The network interface 212 may comprise suitable logic, circuitry, interfaces, and/or code that may be configured to communicate with the gaming server 102, via the communication network 106 (FIG. 1). The network interface 212 may be implemented by use of known technologies to support wired or wireless communication of the gaming server 102 with the communication network 106. Components of the network interface 212 may include, but are not limited to, an antenna, a radio frequency (RF) transceiver, one or more amplifiers, a tuner, one or more oscillators, a digital signal processor, a coder-decoder (CODEC) chipset, a subscriber identity module (SIM) card, and/or a local buffer.

In operation, the processor 202 may be configured to receive a request from one of the plurality of gaming devices 104, via the communication network 106. For example, the processor 202 may receive a view request from the first gaming device 104a associated with the first user 108a, via the communication network 106. The received view request may comprise a request to view a gaming profile (or a specific portion in the gaming profile) of the second user 108b associated with the second gaming device 104b. The second user 108b may be a registered friend of the first user 108a. In another example, the second user 108b may be an acquaintance of the first user 108a. In yet another example, the second user 108b may be a follower of the first user 108a as registered at the gaming server 102. In yet another example, the second user 108b may be an unknown user, who may be engaged in gameplay of one or more games on the second gaming device 104b in an online gaming environment, irrespective of any relationship with the first user 108a.

The EPE detector 208 may be configured to detect an entry point event from a plurality of defined entry point events based on the received view request. The plurality of entry point events may be defined in the secondary memory 206, which may be used to access the gaming profile of the second user 108b. The entry point event may be detected to access the gaming profile of the second user 108b, based on the received view request. For example, the first user 108a is navigating on a UI that corresponds to a game list in the gaming profile of the first user 108a. The first user 108a may press or click a first UI element on the UI, to view the gaming profile of other user, such as the second user 108b, who is associated with a game of the game list. In such a scenario, the entry point event may correspond to the first UI element on the UI that has been pressed or clicked to view the gaming profile of the second user 108b. There may be other defined UI elements that may also lead to the gaming profile of other user, such as the second user 108b. The selection of one of the other UI elements may generate another entry point event used to enter the desired gaming profile.

The processor 202 may be configured to extract, based on the detected entry point event, user-activity information of the first user 108a on the first gaming device 104a from a storage device, such as the secondary memory 206. The user-activity information may include one or more activities of the first user 108a on the first gaming device 104a prior to the detected entry point event. The one or more activities may be a result of one or more clicks or presses, by the first user 108a, on one or more UI elements of the one or more UIs rendered on a display screen (not shown) of the first gaming device 104a prior to the detected entry point event. For example, an activity in the one or more activities may correspond to an action, such as an in-game related action and a now playing-related action. The in-game related action may correspond to an ongoing gameplay of a game on the first gaming device 104a by the first user 108a. The now playing-related action may correspond to the ongoing gameplay of a game of the one or more games on other gaming devices, such as the second gaming device 104b associated with the second user 108b. The activity may include, but is not limited to, a game list-related action, a shared media-related action, a friend-related action, and a community-related action.

In accordance with an embodiment, the user-activity information of the first user 108a may be extracted for an elapsed time prior to the detected entry point event. The elapsed time may correspond to a time period prior to time point associated with communication of the view request by the first gaming device 104a. For example, the elapsed time may correspond to an entire current login session of the first user 108a on the first gaming device 104a. In another example, the elapsed time may correspond to a fixed time duration, for example, 10 seconds, 30 seconds, 30 minutes, last one hour, and/or the like. In yet another example, the elapsed time may correspond to a time duration associated with the one or more activities of the first user 108a on the first gaming device 104a. The detected entry point event may indicate the one or more activities of the first user 108a on the first gaming device 104a prior to a view of the gaming profile of the second user 108b.

The CAGI generator 210 may be configured to generate the context-aware gaming information of the second user 108b. The context-aware gaming information may be generated based on the detected entry point event. The context-aware gaming information may be generated based on the user-activity information of the first user 108a that is associated with the detected entry point event. Prior to the generation of the context-aware gaming information, the CAGI generator 210 may be configured to extract the gaming profile of the second user 108b from the storage device, such as the primary memory 204. The CAGI generator 210 may further extract contextual information from the extracted gaming profile of the second user 108b. In accordance with an embodiment, the contextual information may be extracted from the gaming profile of the second user 108b based on the extracted user-activity information associated with the detected entry point event. The extracted contextual information may include an overview of the gaming profile of the second user 108b. The extracted contextual information may further include gaming information of the one or more games associated with the second user 108b. The extracted contextual information may further include the information associated with shared media content, one or more friends, and one or more communities associated with the gaming profile of the second user 108b. For example, the first user 108a is currently involved in a gameplay of a game (for example, "game-AXY") on a gaming UI displayed on the display screen of the first gaming device 104a. The first user 108a, by use of an input device, may click or press on an UI element of the gaming UI to provide a request to view the gaming profile of the other user, such as the second user 108b, who is currently playing the "game-AXY". In such a scenario, the detected entry point event may correspond to the click or press on the UI element of the gaming UI to view the gaming profile of the second user 108b. The user-activity information of the first user 108a on the first gaming device 104a prior to the detected entry point event may correspond to the gameplay of the "game-AXY". In such a scenario, the extracted contextual information of the second user 108b may include the gaming information, such as achievements or trophies won, achieved by the second user 108b in the gameplay of the "game-AXY". For example, the gaming information may include the gaming achievements and the total gameplay time in the "game-AXY". Table-1 illustrates an exemplary list that includes the plurality of defined entry points in various UI sections and the corresponding extracted contextual information.

TABLE 1

Various entry points and corresponding contextual information

| Entry Points | Contextual Information |
| --- | --- |
| A) For entry into a gaming profile of an unknown user or player | A) Extract contextual information related to: |
| A1) From in-game section of UI | A specific game previously played by the user within the game list |
| A2) From "Player's Met" section of a listed Friend | |
| A3) From Member List/LiveThread/Now Playing section of a listed Community | |
| A4) From a Follow recommendation section of the UI | A customized overview of gaming profile |
| A5) From a live view section of a game in the UI | Shared media content |
| B)Entry into a gaming profile of a friend or follower | Extract contextual information associated with registered friend or follower related to: |
| B1) From a Now Playing section | A specific game within game list |
| B2) From a profile, a friend list, a member list of a group, a people list from a gallery view section of one or more UIs | Overview of a desired gaming profile |
| B3) From "what's new" section | A specific new game within game list |
| C) Entry into a gaming profile of a potential friend (not yet a registered friend) | Extract contextual information associated with the potential friend related to: |
| C1) From "Players You May Know" section or a "Member list" section of a party | An overview of a gaming profile |
| D) Entry into a gaming profile of myself (such as the first user 108a) | Contextual information of gaming profile of self, may be extracted |

The various entry points, for example, defined by rows A1-A5, B1-B3, C1, and D in Table-1, may correspond to various UI elements of the one or more UIs that are rendered on the first gaming device 104a. For example, an entry point, such as "from in game section of UI" in section A1 of Table-1 may correspond to an UI element, such as a UGP tab 416a of an UI 414, as shown in FIG. 4B. In another example, the entry point, such as "from a live view section of a game in the UI" in row A5 of Table-1 may correspond to the UI element, such as a UGP tab 416a of an UI 442, as shown in FIG. 4D.

Now referring back to FIG. 2, after the extraction of the contextual information from the gaming profile of the second user 108b, the CAGI generator 210 may generate the context-aware gaming information of the second user 108b based on the extracted contextual information. The processor 202 may further permit the first user 108a to view the generated context-aware gaming information of the second user 108b on the display screen of the first gaming device 104a. In order to permit the first user 108a to view the generated context-aware gaming information of the second user 108b, the processor 202 may communicate the generated context-aware gaming information along with a desired gaming profile, such as the gaming profile of the second user 108b, to the first gaming device 104a, via the communication network 106. The communicated context-aware gaming information and the gaming profile of the second user 108b may be rendered on a same UI on the display screen of the first gaming device 104a. The generated context-aware gaming information rendered on the UI may be dynamically updated based on one or more current activities of the second user 108b on the second gaming device 104b.

The display of the generated context-aware gaming information on the first gaming device 104a may be controlled based on the one or more activities of the first user 108a on the first gaming device 104a. The one or more activities may be associated with the detected entry point event. The context-aware gaming information may be displayed within the gaming profile of the second user 108b. The display of the generated context-aware gaming information may provide a meliorated experience to the first user 108a while viewing the gaming profile of the second user 108b. Furthermore, the display of the generated context-aware gaming information may facilitate the first user 108a to identify a skill level of the second user 108b in the one or more games. It may be easier for the first user 108a to take a decision with respect to sending of a friend request to the second user 108b, and/or follow or block the second user 108b. It may be further easier for the first user 108a to take a decision with respect to initiation or joining of the gameplay of the one or more games with the second user 108b. Overall, the display of the generated context-aware gaming information along with the gaming profile of the second user 108b on the display screen of the first gaming device 104a may increase the interest level and a total time of engagement of the first user 108a on the gaming server 102 in the online gaming environment.

Figure 3:
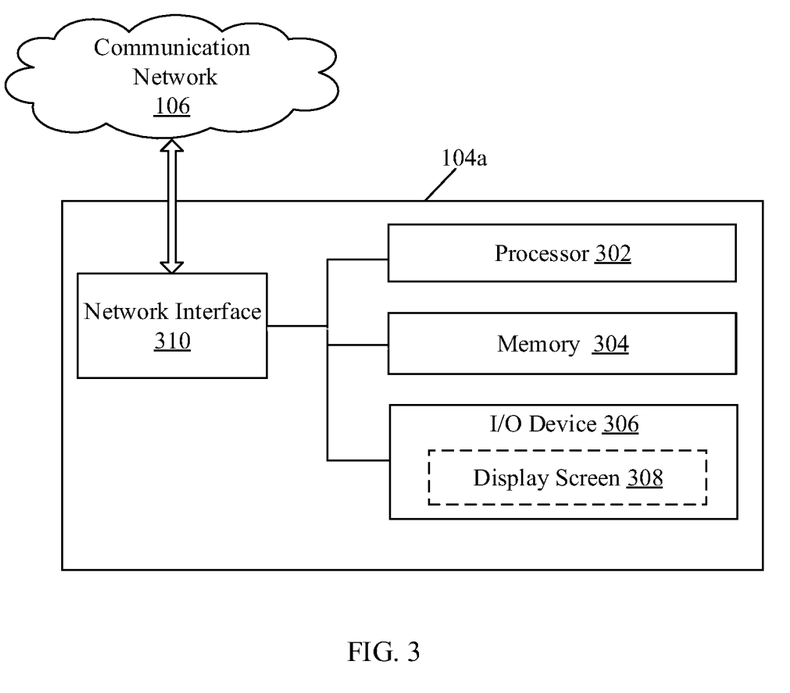
FIG. 3 is a block diagram that illustrates an exemplary gaming device, in accordance with an embodiment of the disclosure.

FIG. 3 is a block diagram that illustrates an exemplary gaming device, in accordance with an embodiment of the disclosure. FIG. 3 is described in conjunction with elements from, for example, FIG. 1 and FIG. 2. With reference to FIG. 3, there is shown a block diagram of an exemplary gaming device, such as the first gaming device 104a. The first gaming device 104a may include one or more circuits, such as a processor 302, a memory 304, an input/output (I/O) device 306, a display screen 308, and a network interface 310. The I/O device 306 may include the display screen 308.

In accordance with an embodiment, the processor 302 may be communicatively coupled to the memory 304, the I/O device 306, the display screen 308, and the network interface 310. The network interface 310 may be configured to communicate to the gaming server 102 and/or one or more other gaming devices, such as the second gaming device 104b, via the communication network 106.

The processor 302 may comprise suitable logic, circuitry, interfaces, and/or code that may be configured to execute a set of instructions stored in the memory 304. The processor 302 may be further configured to display one or more UIs received by the network interface 310. Examples of the implementation of the processor 302 may be similar to that of the processor 202 (FIG. 2).

The memory 304 may comprise suitable logic, circuitry, and/or interfaces that may be configured to store a machine code and/or a set of instructions executable by the processor 302. The memory 304 may be further configured to store operating systems and associated applications of the first gaming device 104a. Examples of implementation of the memory 304 may include, but are not limited to, Random Access Memory (RAM), Read Only Memory (ROM), Solid-state Drive (SSD), Hard Disk Drive (HDD), Flash memory, and/or a Secure Digital (SD) card.

The I/O device 306 may comprise suitable logic, circuitry, interfaces, and/or code that may be configured to receive an input from and provide an output to the first user 108a associated with the first gaming device 104a. Examples of the input devices may include, but are not limited to, a camcorder, a touch screen, a joystick, a microphone, a motion sensor, a gaming device, a light sensor, and/or a docking station. Examples of the output devices may include, but are not limited to, the display screen 308, a projector screen, and/or a speaker.

The network interface 310 may comprise suitable logic, circuitry, interfaces, and/or code that may be configured to communicate with the gaming server 102, via the communication network 106 (FIG. 1). The network interface 310 may be implemented by use of known technologies to support wired or wireless communication of the first gaming device 104*a* with the communication network 106. The network interface 310 may include, but is not limited to, an antenna, a radio frequency (RF) transceiver, one or more amplifiers, a tuner, one or more oscillators, a digital signal processor, a coder-decoder (CODEC) chipset, a subscriber identity module (SIM) card, and/or a local buffer.

In operation, the plurality of users 108, such as the first user 108*a*, may utilize the I/O device 306, to provide an input to communicate a view request to the gaming server 102, via the communication network 106. The network interface 310 may transmit the view request under the control of the processor 302 to view a gaming profile of one of the plurality of users 108, such as the second user 108*b*. The processor 302 may be configured to render a UI on the display screen 308 based on the transmitted view request. The UI may include the gaming profile and context-aware gaming information of the second user 108*b* generated by the gaming server 102. The generated context-aware gaming information may include contextual information from the gaming profile of the second user 108*b*. The contextual information may be extracted from the gaming profile of the second user 108*b*, based on an entry point event detected on the first gaming device 104*a*. The detected entry point event may indicate one or more activities of the first user 108*a* on the first gaming device 104*a* prior to the view of the gaming profile of the second user 108*b*.

The displayed context-aware gaming information within the gaming profile of the second user 108*b*, may assist the first user 108*a* to decide to take a further action. For example, the first user 108*a* may get motivated to befriend the second user 108*b*. The first user 108*a* may provide an input, by use of the I/O device 306, to transmit a friend request to the second user 108*b*. The first user 108*a* may further determine or decide to follow or block the second user 108*b* based on the generated context-aware gaming information of the second user 108*b*. The first user 108*a* may further initiate or join a gameplay with the second user 108*b* based on the generated context-aware gaming information of the second user 108*b*.

FIGS. 4A, 4B, 4C, 4D, and 4E are block diagrams that illustrate exemplary scenarios and user interfaces for implementation of the disclosed information processing server and method to generate context-aware gaming information in an online gaming environment, in accordance with an embodiment of the disclosure. FIGS. 4A to 4E are described in conjunction with elements from the FIGS. 1, 2, and 3.

Figure 4A:
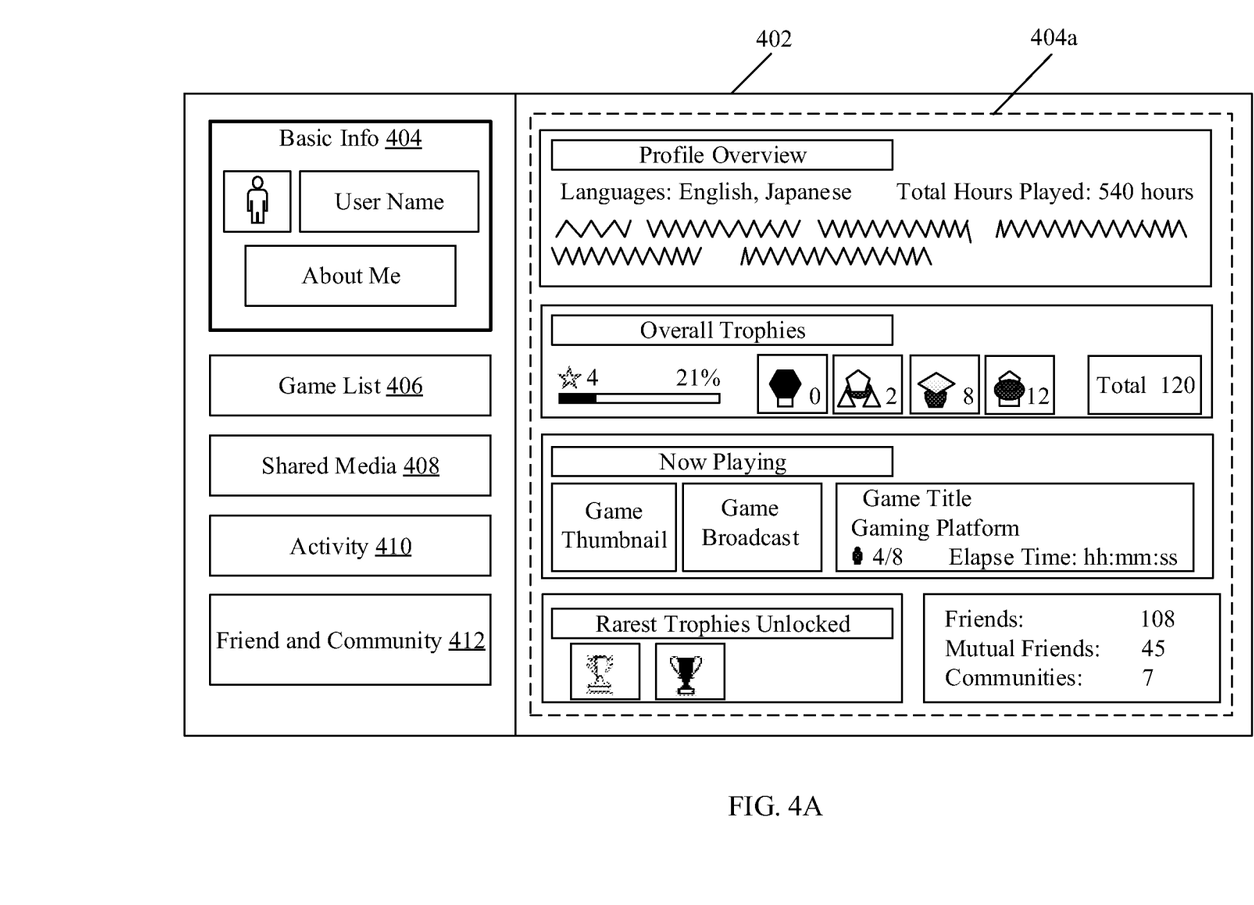
FIGS. 4A, 4B, 4C, 4D, and 4E are block diagrams that illustrate exemplary scenarios and user interfaces for implementation of the disclosed gaming server and method to generate context aware gaming information in an online gaming environment, in accordance with an embodiment of the disclosure.
Figure 4B:
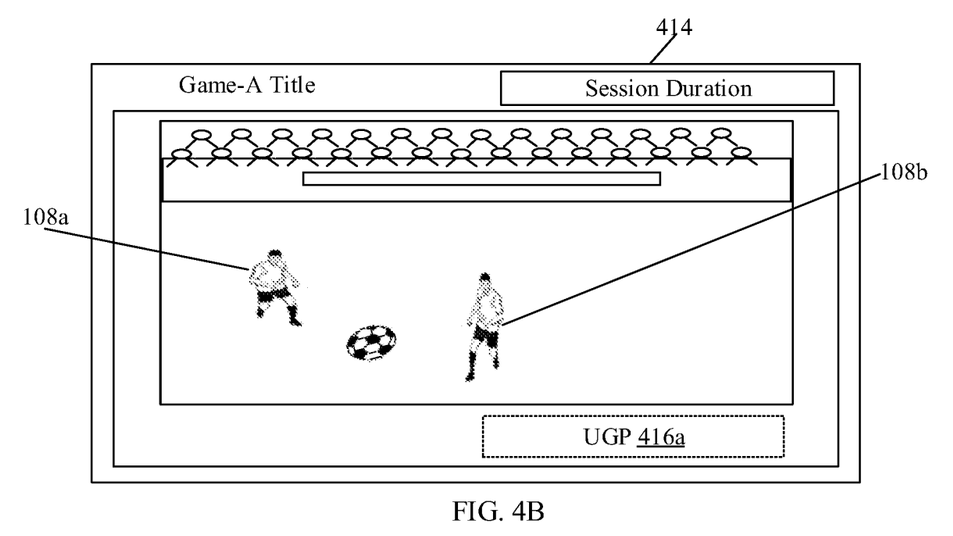

With reference to FIG. 4A, there is shown an exemplary UI, such as a UI 402, which may be rendered on the display screen 308 of the first gaming 104*a*. The UI 402 may be configured to display a gaming profile of the first user 108*a*. The UI 402 may include various UI elements associated with the gaming profile of the first user 108*a*. For example, the various UI elements may include one or more input tabs, such as a basic info tab 404, a game list tab 406, a shared media tab 408, an activity tab 410, and a friend and community tab 412. The UI 402 may further include a separate UI section, for example, a UI section 404*a*. The UI section 404*a* may be rendered on the UI 402 in an event the basic info tab 404 is selected, as shown in FIG. 4A. Similarly, other UI sections (not shown) associated with the game list tab 406, the shared media tab 408, the activity tab 410, and the friend and community tab 412, may be displayed on the UI 402 based on the user selection.

Each of the one or more input tabs may be further associated with a defined area on the UI 402. For example, the defined area associated with the basic info tab 404 may include a profile image, for example, a profile picture and/or an avatar, of the first user 108*a*. The defined area associated with the basic info tab 404 may further include a user name, for example, a real name, a display name, and/or an online ID, of the first user 108*a*. The basic info tab 404 may further include a brief message, such as self-details ("about me"), posted by the first user 108*a*. The defined area associated with the basic info tab 404 may further include an online indicator (not shown) that may indicate about current availability of the first user 108*a*. The gaming profile rendered on the UI 402 may further include various other UI elements, such as a profile overview section, overall trophies section, now playing section, and/or rarest trophies unlocked section, associated with the basic info tab 404.

The one or more input tabs, such as the basic info tab 404, the game list tab 406, the shared media tab 408, the activity tab 410, and the friend and community tab 412, may permit the first user 108*a* to take a corresponding action. For example, the first user 108*a* may press or click the basic info tab 404, to transmit a request, from the first gaming device 104*a*, to view detailed (or full) profile information. The processor 202 may render the UI section 404*a*, based on the received request, as shown in FIG. 4A. The profile information on the rendered UI section 404*a* may include information associated with the profile overview section, the overall trophies section, the now playing section, and the rarest trophies unlocked section, as shown in FIG. 4A.

With reference to FIG. 4B, there is shown an exemplary UI, such as a UI 414, displayed on the display screen 308 of the first gaming device 104*a* associated with the first user 108*a*. The UI 414 may include various UI elements, such as one or more user gaming profile (UGP) tabs, for example, a UGP tab 416*a*.

The UI 414 may be rendered on the display screen 308 of the first gaming device 104*a* in an event when the first user 108*a* may provide an input to play a game (for example, "game-A") with the second user 108*b*, on the UI 402. For example, the first user 108*a* may press or click on the game list tab 406 on the UI 402 (FIG. 4A) to provide an input to select the "game-A" from the one or more games. Further, the first user 108*a* may press or click on a start tab (not shown) on a separate UI associated with the game list tab 406 to provide an input to play the "game-A" with the second user 108*b*, as shown. The processor 202 may render the UI 414 on the display screen 308 of the first gaming device 104*a* based on a request to start a gameplay of the "game-A" with the second user 108*b*. Thereafter, the gaming server 102 may be configured to control display of the UI 414 to allow the gameplay of the "game-A" between the first user 108*a* and the second user 108*b*, as shown. The UI 414 may further include an identifier such as a title of the "game-A", as shown. The UI 414 may further indicate an ongoing session duration of the gameplay of the "game-A", as shown. The first user 108*a* may press or click on the UGP tab 416*a* on the first gaming device 104*a* to view the gaming profile of the second user 108*b*, who is involved in the gameplay of the "game-A" with the first user 108*a*.

Figure 4C:
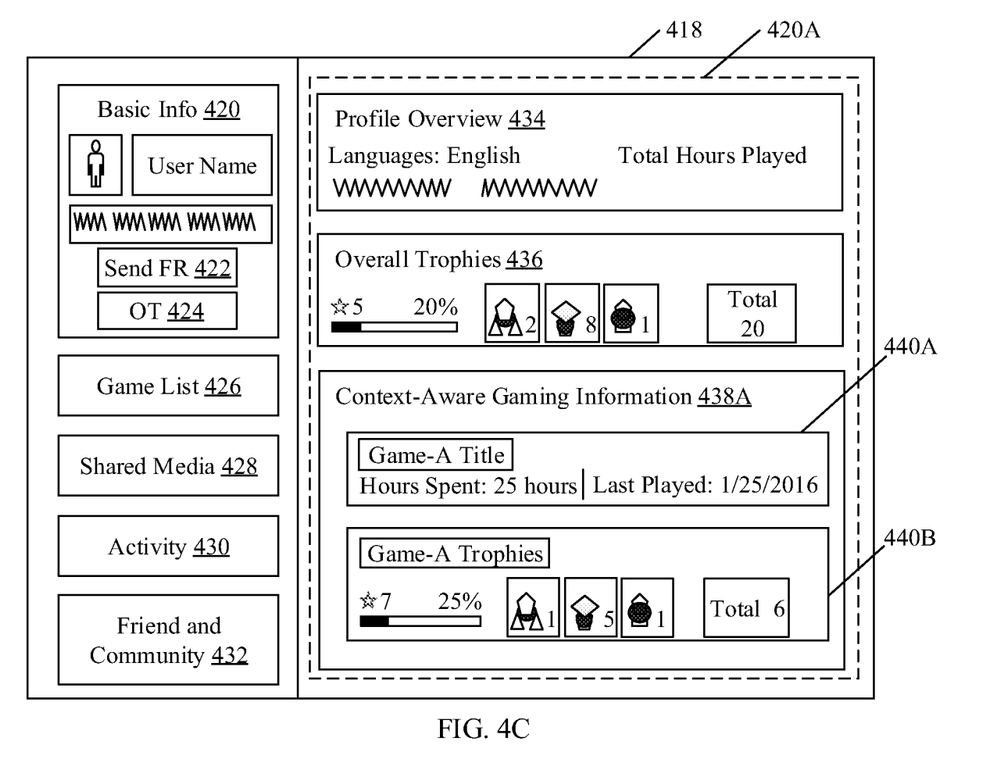
Figure 4D:
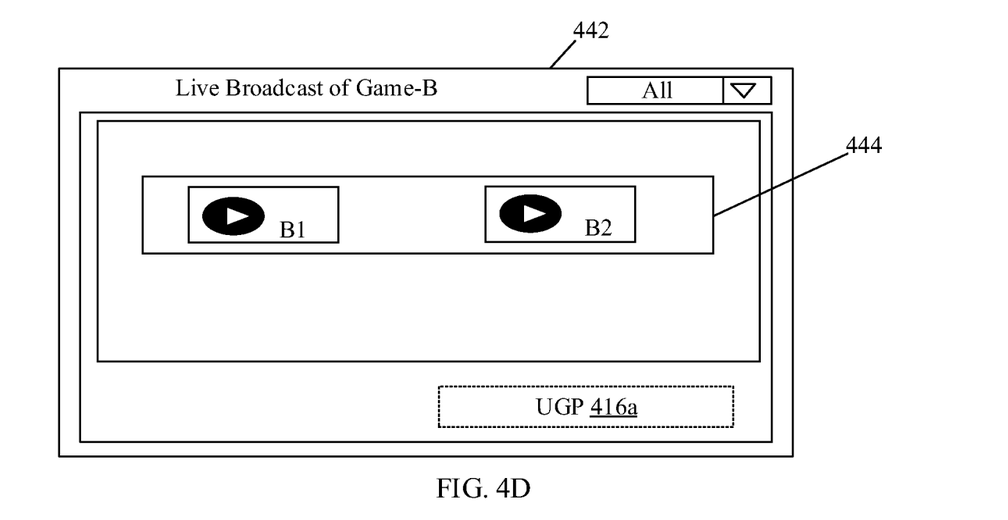

With reference to FIG. 4C, there is shown an exemplary UI, such as a UI 418, displayed on the display screen 308 of the first gaming device 104*a* associated with the first user 108*a*. The processor 202 may be configured to render the UI 418 in an event when the first user 108*a* may provide an input to view the gaming profile of the second user 108*b*, on the UI 414. For example, the first user 108*a* may press or click on the UGP tab 416a on the UI 414 to transmit the request to view the gaming profile of the second user 108b. The processor 202 may then render the UI 418 that may be configured to display the gaming profile of the second user 108b, as shown. The gaming profile of the second user 108b rendered on the UI 418 may include various UI elements, for example, one or more input tabs, such as, a basic info tab 420, a send friend request (FR) tab 422, an option tab (OT) 424, a game list tab 426, a shared media tab 428, an activity tab 430, and a friend and community tab 432. The UI 418 may further include a separate UI section, for example, a UI section 420A rendered on the UI 418, as shown in FIG. 4C. The UI section 420A may include various other UI elements, for example, a profile overview section 434, an overall trophies section 436 related to the profile of the second user 108b. Additionally, a context-aware gaming information section 438A, may also be included in the UI section 420A. The context-aware gaming information section 438A may include one or more sub-sections, such as a section 440A and a section 440B, as shown in FIG. 4C.

The one or more input tabs, such as the basic info tab 420, the game list tab 426, the shared media tab 428, the activity tab 430, and the friend and community tab 432, may correspond to the one or more categories of information in the gaming profile of the second user 108b. Each of the one or more input tabs may be further associated with a defined area on the UI 418. For example, the defined area associated with the basic info tab 420 may include a profile image, for example, a profile picture and/or an avatar, of the second user 108b. The defined area associated with the basic info tab 420 may further include a user name, for example, a real name, a display name, and/or an online ID, of the second user 108b. The basic info tab 420 may further include a brief message, such as self-details, posted by the second user 108b. The first user 108a may press or click on the send FR tab 422 to send a friend request to the second user 108b, as shown. Further, the first user 108a may click or press on the OT 424 to select a different option (for example, follow, block, and/or the like) to connect or disassociate with the second user 108b. The defined area associated with the basic info tab 420 may further include an online indicator (not shown) that may indicate a current availability of the second user 108b. The basic info tab 420 may also include a last login time (not shown) and a last gameplay time (not shown) of the second user 108b.

The profile overview section 434 on the UI 420A may include languages that are known to the second user 108b. The profile overview section 434 may further include a profile description of the second user 108b. The profile overview section 434 may further include total hours played by the second user 108b in the gameplay of the one or more games, as shown.

The overall trophies section 436 on the UI 420A may include a trophy level and/or a percentage of progress in the trophy level in the gameplay of the one or more games, as shown. The overall trophies section 436 may further include a total number of trophies (for example, aggregated trophies) unlocked by the second user 108b in the gameplay of the one or more games. The unlocked trophies may also be referred to as trophies that are won or attained in the gameplay of the one or more games. The overall trophies section 436 may further include a total number of different type of trophies won by the second user 108b in the gameplay of each of the one or more games, as shown. For example, trophies of the one or more games may be segregated into various types, such as platinum trophies, gold trophies, silver trophies, and bronze trophies. In such examples, the overall trophies section 436 may further include, the total number of trophies for each type of trophies, unlocked by the second user 108b in the gameplay of each of the one or more games.

The context-aware gaming information section 438A on the UI 420A may include the context-aware gaming information of the second user 108b generated by the CAGI generator 210. The context-aware gaming information of the second user 108b may be generated based on an entry point event detected by the EPE detector 208. With respect to the ongoing exemplary scenario described above in conjunction with FIG. 4A and 4B, the entry point event may correspond to the click or press on the UGP tab 416a on the UI 414 (FIG. 4B) in the gameplay of the "game-A". Based on the detected entry point event, the CAGI generator 210 may extract contextual information of the "game-A" from the gaming profile of the second user 108b. The detected entry point event may indicate that the first user 108a was interested in the "game-A". Thereafter, the CAGI generator 210 may generate the context-aware gaming information of the second user 108b based on the extracted contextual information. The generated context-aware gaming information may be displayed, for example, in the context-aware gaming information section 438 within the UI section 420A. The context-aware gaming information section 438 may include enhanced information about the gaming information of the second user 108b in context of the "game-A". For example, the section 440A in the context-aware gaming information section 438A may include the title of the "game-A". The section 440A may further include timing information, for example, total hours spent by the second user 108b in the gameplay of the "game-A", as shown. The section 440A may further include a time stamp that indicates a last played time of the "game-A" by the second user 108b. The section 440B in the context-aware gaming information section 438A may include trophies (for example, aggregated trophies) unlocked by the second user 108b in the gameplay of the "game-A". The trophies may further include the total number of different type of trophies won by the second user 108b in the gameplay of the "game-A". For example, trophies of the "game-A" may be segregated into various types, such as platinum trophies, gold trophies, silver trophies, and bronze trophies. In such examples, the trophies may further include, the total number of trophies for each type of trophies, unlocked by the second user 108b in the gameplay of the "game-A". Thus, in the event the first user 108a selected the UGP tab 416a on the UI 414 (FIG. 4B) to view the gaming profile of the second user 108b while the first user 108a was engaged in the gameplay of the "game-A", the gaming server 102 not only presented the requested item, such as the gaming profile of the second user 108b, as that of the issued command, but also the automatically generated content-aware gaming information. The generated content-aware gaming information, may be displayed, for example, in the context-aware gaming information section 438 within the UI section 420A, such that the first gaming device 104a and the gaming server 102 interaction may now mimic intelligent human-like or intuitive responses. The context-aware gaming information section 438 may include intuitive information about the gaming information of the second user 108b in context of the "game-A" based on the detected entry point event (entry from the "in-game section" while the first user 108a was engaged in the gameplay of the "game-A"). The CAGI generator 210 provides an ability to the gaming server 102 for enhanced interaction with the plurality of gaming devices 104 to eloquently converse with the players in the online gaming environment.

With reference to FIG. 4D, there is shown another exemplary UI, such as a UI 442, displayed on the display screen 308 of the first gaming device 104*a* associated with the first user 108*a*. The UI 442 may be rendered on the display screen 308 of the first gaming device 104*a* in an event when the first user 108*a* may provide an input to view a live broadcast of a game, such as "game-B", on the UI 402. For example, the first user 108*a* may press or click on a game broadcast tab on the UI 402 (FIG. 4A) to provide an input to view the live broadcast of the "game-B". The processor 202 of the gaming server 102 may render the UI 442 on the display screen 308 of the first gaming device 104*a*, based on the request to view the live broadcast of the "game-B". The rendered UI 442 may include media content that may then be shared by one or more other users, such as the second user 108*b*. The UI 442 may include one or more shared media sections, such as a shared media section 444. The shared media section 444 may include the media content that is currently shared by the second user 108*b*, as shown. In a scenario where the first user 108*a* may wish to view the gaming profile of the second user 108*b*, the first user 108*a* may press or click on the UGP tab 416*a* on the UI 442 to view the gaming profile of the second user 108*b*.

Figure 4E:
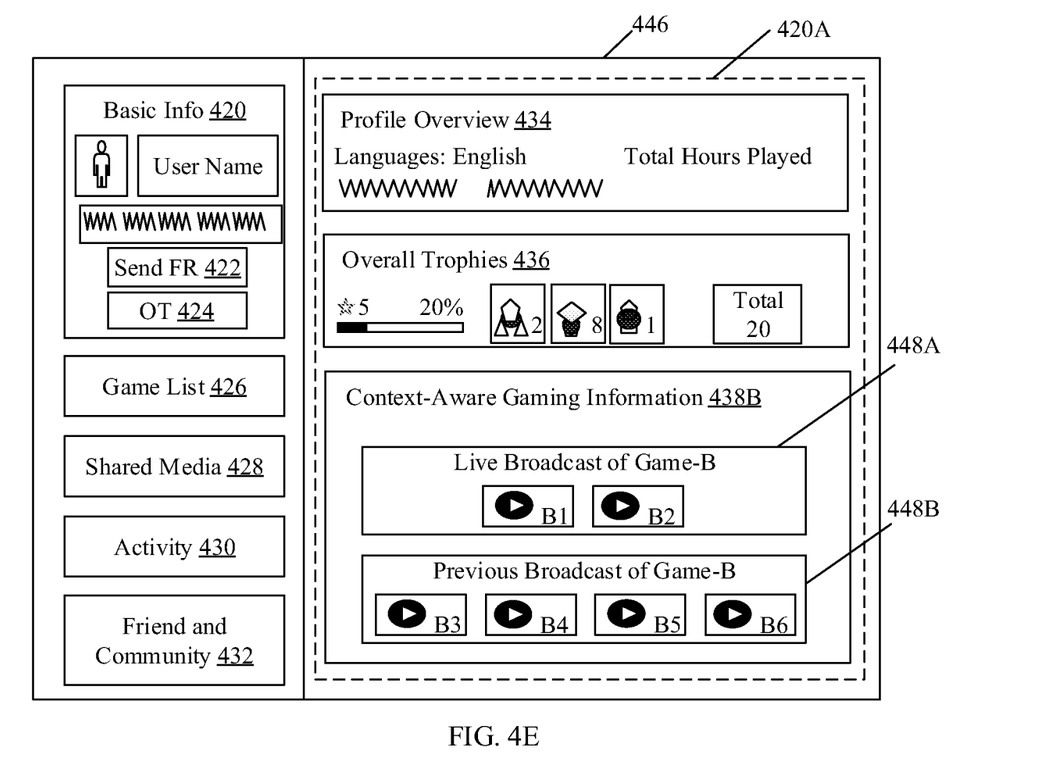

With reference to FIG. 4E, there is shown an exemplary UI, such as a UI 446, displayed on the display screen 308 of the first gaming device 104*a* associated with the first user 108*a*. The processor 202 may be configured to render the UI 446 based on the received request from the first gaming device 104*a* to view the gaming profile of the second user 108*b*. For example, as discussed in FIG. 4D, in the event the first user 108*a* presses or clicks on the UGP tab 416*a* on the UI 442, the processor 202 of the gaming server 102 may control display of the UI 446. The UI 446 may include the gaming profile of the second user 108*b*, similar to that as described in the FIG. 4C. However, different context-aware gaming information may be generated, as shown for example, in a context-aware gaming information section 438B. The context-aware gaming information section 438B may include one or more sub-sections, such as a section 448A and a section 448B, as shown in FIG. 4E. The different context-aware gaming information may be generated as a result of a change in the entry point event. In the exemplary scenario with respect to FIGS. 4D and 4E, the entry point event may correspond to the click or press on the UGP tab 416*a* on the UI 442 during the live broadcast of the "game-B". Based on the detected entry point event, the CAGI generator 210 may extract contextual information of the "game-B" from the gaming profile of the second user 108*b*. Thereafter, the CAGI generator 210 may generate the context-aware gaming information of the second user 108*b* based on the extracted contextual information. The generated context-aware gaming information may be displayed in the context-aware gaming information section 438B in the same UI, such as the UI 420A. For example, the section 448A in the context-aware gaming information section 438A may include the media content associated with the live broadcast of the "game-B" by the second user 108*b*, as shown. The section 448B may include the media content associated with any previous broadcast of the "game-B" by the second user 108*b*, as shown. Thus, a same command to view the gaming profile of the second user 108*b* may result in different user experience based on the different entry points to access the same gaming profile of the second user 108*b*.

Figure 5:
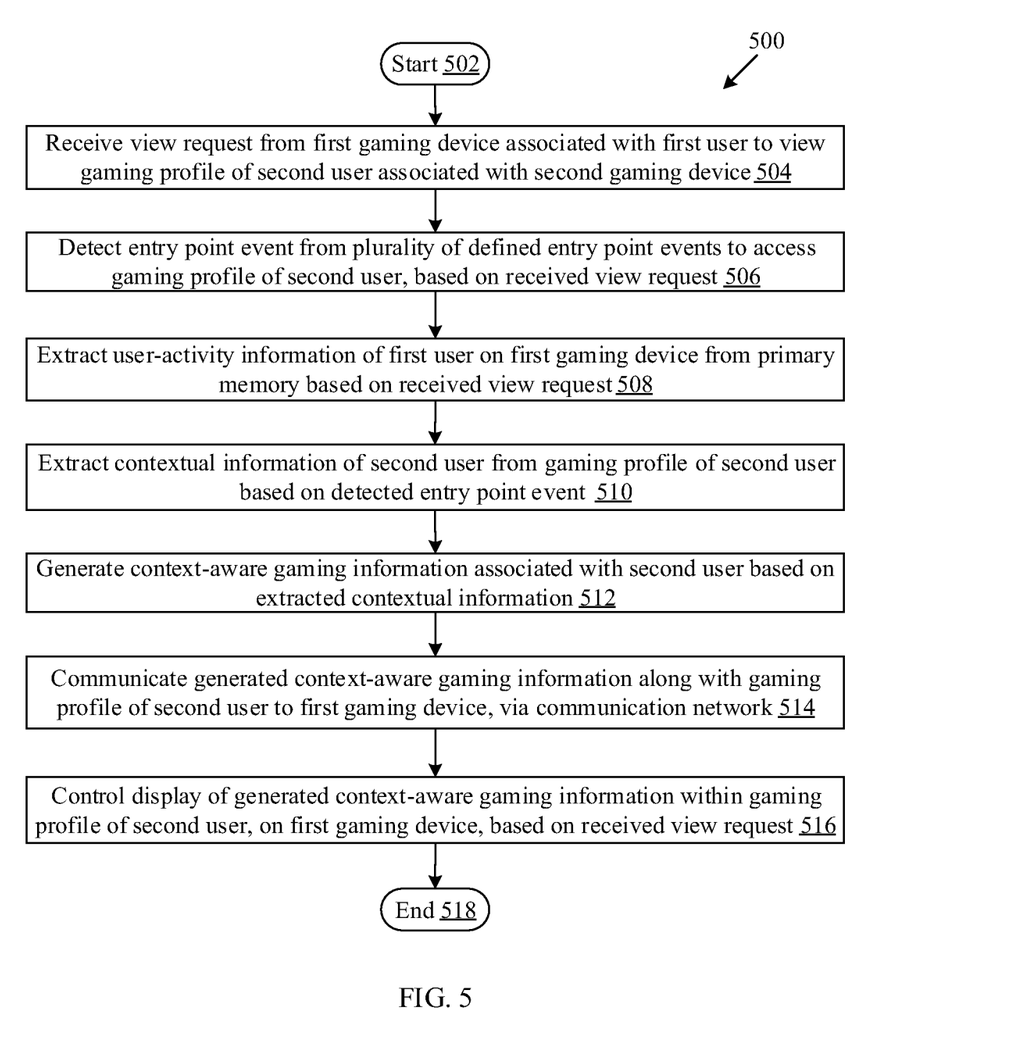
FIG. 5 is a flowchart that illustrates exemplary operations to generate context aware gaming information in an online gaming environment, in accordance with an embodiment of the disclosure.

FIG. 5 is a flow chart that illustrates exemplary operations to generate context-aware gaming information in an online gaming environment, in accordance with an embodiment of the disclosure. With reference to FIG. 5, there is shown a flow chart 500. The flow chart 500 is described in conjunction with FIGS. 1, 2, 3, and 4A to 4E. The method starts at 502 and proceeds to 504.

At 504, a view request to view a gaming profile of the second user 108*b* associated with the second gaming device 104*b* may be received from the first gaming device 104*a* associated with the first user 108*a*. The view request may be received by the gaming server 102. An example of the view request, such as the selection of the UGP tab 416*a*, is shown and described in the FIGS. 4B and 4D.

At step 506, an entry point event may be detected from a plurality of defined entry point events to access the gaming profile of the second user 108*b*, based on the received view request. The EPE detector 208 may detect the entry point event from the plurality of defined entry point events based on the received view request. The detected entry point event may indicate one or more activities of the first user 108*a* on the first gaming device 104*a* prior to a view of the gaming profile of the second user 108*b* on the first gaming device 104*a*. The plurality of entry point events may be defined in the gaming server 102, which may be used to access the gaming profile of the second user 108*b*. The plurality of defined entry point events may correspond to different UI elements of one or more UIs rendered on the first gaming device 104*a*. Examples of the detected entry point events has been described in the FIG. 4C and 4E in conjunction with FIG. 4B and 4D, respectively.

At step 508, user-activity information of the first user 108*a* on the first gaming device 104*a* may be extracted from the secondary memory 206, based on the received view request. The processor 202 may be configured to extract the user-activity information from the secondary memory 206 based on the received view request. The user-activity information may include one or more activities of the first user 108*a* on the first gaming device 104*a* prior to the detected entry point event. In accordance with an embodiment, the user-activity information of the first user 108*a* may be extracted for an elapsed time prior to the detected entry point event.

At step 510, contextual information of the second user 108*b* may be extracted from the gaming profile of the second user 108*b* based on the detected entry point event. The CAGI generator 210 may extract the contextual information of the second user 108*b* from the gaming profile of the second user 108*b*. The contextual information may be extracted from the gaming profile of the second user 108*b* based on the extracted user-activity information associated with the detected entry point event.

At step 512, context-aware gaming information associated with the second user 108*b* may be generated based on the extracted contextual information. The CAGI generator 210 may generate the context-aware gaming information of the second user 108*b* based on the extracted contextual information.

At step 514, the generated context-aware gaming information along with the gaming profile of the second user 108*b* may be communicated to the first gaming device 104*a*, via the communication network 106. The processor 202 may communicate the generated context-aware gaming information along with the gaming profile of the second user 108*b* to the first gaming device 104*a*, via the communication network 106. The communicated context-aware gaming information and the gaming profile of the second user 108*b* may be rendered on a same UI on the display screen 308 of the first gaming device 104*a*. Examples of the generated context-aware gaming information, such as the context-aware gaming information section 438A and 438B, is depicted in the FIG. 4C and 4E.

At step 516, display of the generated context-aware gaming information within the gaming profile of the second user 108b on the first gaming device 104a may be controlled. The processor 202 may control the display of the generated context-aware gaming information on the first gaming device 104a, based on the received view request. The context-aware gaming information may be provided within the gaming profile of the second user 108b. Control may pass to end 518.

In accordance with an embodiment of the disclosure, an information processing server is disclosed. The information processing server, such as the gaming server 102 (shown in FIG. 1), may comprise one or more circuits, such as the processor 202, the EPE detector 208, and the CAGI generator 210 (shown in FIG. 2), that may be configured to receive an input from a first gaming device 104a associated with the first user 108a. The input may be received to view a gaming profile of other users, such as the second user 108b associated with the second gaming device 104b. The EPE detector 208 may be configured to detect an entry point event from a plurality of defined entry point events, based on user-activity information of the first user 108a on the first gaming device 104a prior to the detected entry point event. The CAGI generator 210 may be configured to generate the context-aware gaming information of the second user 108b based on the detected entry point event. The processor 202 may be further configured to communicate the generated context-aware gaming information along with the gaming profile of the second user 108b to the first gaming device 104a. The communicated context-aware gaming information and the gaming profile of the second user 108b may be rendered on a same UI on the display screen 308 of the first gaming device 104a. The display of content of the generated context-aware gaming information along with the gaming profile of the second user 108b may be controlled, based on one or more activities of the first user 108a prior to the detected entry point event.

Based on the display of the generated context-aware gaming information, it may be convenient for a player, such as the first user 108a, to see at a glance what other users, such as the second user 108b, have achieved or shared in the context of the user-activity information of the first user 108a. For example, the first user 108a, by use of UIs, such as the UIs 418 and 446, may be able to identify or discover key gaming data, such as gaming skills, gaming progress, shared media content, and/or the like, in one or more games attained or achieved by the second user 108b in the context of the user-activity information on the first gaming device 104a. Further, based on the display of the generated context-aware gaming information, it may be convenient for the first user 108a to decide whether to befriend other users or not. Such generated context-aware gaming information may further help the first user 108a to follow or block the other users. Further, based on the display of the generated context-aware gaming information, the first user 108a may decide to start or join a gameplay of the one or more games with the other users. Overall, the display of the generated context-aware gaming information may provide a meliorated user experience that may encourage the users to expand their gaming network, gaming skills, and spend more time in the online gaming environment.

Currently, conventional systems merely provides static information of users with negligible information in context with current gaming activities of the users in a network-based gaming environment. Due to lack of context-aware gaming information, the users may not be motivated to spend more time in game-related social interaction. In contrast, the disclosed information processing server, such as the gaming server 102, performs an effective and efficient extraction of contextual information from the gaming profiles of other users based on an entry point event of a user on a gaming device. Such operations performed by the processor 202, the EPE detector 208, and/or the CAGI generator 210, provides an ability to the gaming server 102 to provide a friendly, effective, and efficient environment for the generation of the context-aware gaming information of the other users in the online gaming environment. For example, the EPE detector 208 and the CAGI generator 210 of the gaming server 102 effectively solves a particular technological problem of how to provide different and intuitive user experience to a player based on a same command on a same gaming device, for example, to view the gaming profile of a user, such as the second user 108b. The ability of the gaming server 102 to display the generated context-aware gaming information within the gaming profile of the other users further provides a decision making tool to a user that encourage the user to expand their gaming network, gaming skills, and spend more time in the online gaming environment.

Various embodiments of the disclosure may provide a non-transitory computer-readable medium and/or storage medium, wherein there is stored thereon, a machine code and/or a set of instructions with at least one code section executable by a machine and/or a computer to detect an entry point event from a plurality of defined entry point events. The at least one code section in the gaming server 102 may cause the machine and/or computer to perform the operations that comprise generation of context-aware gaming information of the second user 108b based on the detected entry point event on the first gaming device 104a. The at least one code section in the gaming server 102 may cause the machine and/or computer to perform the operations that control the display of the generated context-aware gaming information within the gaming profile of the second user 108b, on the first gaming device 104a based on the received view request.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted to carry out the methods described herein may be suited. A combination of hardware and software may be a general-purpose computer system with a computer program that, when loaded and executed, may control the computer system such that it carries out the methods described herein. The present disclosure may be realized in hardware that comprises a portion of an integrated circuit that also performs other functions.

The present disclosure may also be embedded in a computer program product, which comprises all the features enabling the implementation of the methods described herein, and which when loaded in a computer system is able to carry out these methods. Computer program, in the present context, means any expression, in any language, code or notation, of a set of instructions intended to cause a system having an information processing capability to perform a particular function either directly, or after either or both of the following: a) conversion to another language, code or notation; b) reproduction in a different material form.

While the present disclosure has been described with reference to certain embodiments, it will be understood by those skilled in the art that various changes may be made and equivalents may be substituted without departing from the scope of the present disclosure. In addition, many modifications may be made to adapt a particular situation or material to the teachings of the present disclosure without departing from its scope. Therefore, it is intended that the present disclosure not be limited to the particular embodiment disclosed, but that the present disclosure will include all embodiments falling within the scope of the appended claims.

What is claimed is:

1. A gaming server, comprising:
one or more circuits communicatively coupled to a plurality of information processing devices, wherein said one or more circuits are configured to:
receive a view request from an information processing device associated with a first user,
wherein said plurality of information processing devices includes said information processing device;
control said information processing device to display an ongoing session of a game played between said first user and a second user,
wherein said ongoing session of said game is displayed based on said received view request;
control said information processing device to display a user interface (UI) element during said display of said ongoing session of said game,
wherein said UI element is selectable to view a gaming profile of said second user;
detect an entry point event on said UI element during said display of said ongoing session of said game,
wherein said detected entry point event indicates a detection of an input of said first user on said information processing device;
generate context-aware gaming information of said second user based on user-activity information of said first user and said detected entry point event,
wherein said context-aware gaming information includes information of said second user in context of said game that is played by said second user with said first user in said ongoing session of said game; and
control said information processing device to display said gaming profile of said second user and said generated context-aware gaming information,
wherein said gaming profile of said second user is displayed based on selection of a tab, and
wherein the tab is displayed along with said ongoing session of said game played between said first user and said second user.

2. The gaming server according to claim 1, further comprising a storage device, wherein
said one or more circuits are further configured to extract user-activity information of said first user from said storage device based on said received view request, and
said user-activity information of said first user is extracted before said detection of said entry point event.

3. The gaming server according to claim 2, wherein said user-activity information of said first user corresponds to at least one of an in-game-related action, a now playing-related action, a game-related action, a shared media-related action, a friend-related action, or a community-related action.

4. The gaming server according to claim 1, wherein said entry point event corresponds to said UI element.

5. The gaming server according to claim 1, wherein
said one or more circuits are further configured to extract contextual information from said gaming profile of said second user for said generation of said context-aware gaming information.

6. The gaming server according to claim 5, wherein said one or more circuits are further configured to extract said contextual information from said gaming profile of said second user based on said detected entry point event.

7. The gaming server according to claim 6, wherein said extracted contextual information comprises at least one of an overview of said gaming profile of said second user, at least one game played by said second user, at least one gaming achievement of said second user, streaming media content shared by said first user and said second user, at least one friend of said second user, or at least one community of said second user.

8. The gaming server according to claim 1, wherein
said one or more circuits are further configured to communicate said generated context-aware gaming information along with said gaming profile of said second user to said information processing device, and
said communicated context-aware gaming information and said gaming profile of said second user is displayed on a same UI on a display screen of said information processing device.

9. The gaming server according to claim 8, wherein said one or more circuits are further configured to control the display screen, to display said gaming profile of said second user, based on said input of said first user.

10. The gaming server according to claim 1, wherein
said one or more circuits are further configured to control, said information processing device to display said gaming profile of said second user along with said context-aware gaming information, based on said detected entry point event.

11. An information processing method, comprising:
in a gaming server that comprises one or more circuits, wherein said one or more circuits are communicatively coupled to a plurality of information processing devices:
receiving, by said one or more circuits, a view request from an information processing device associated with a first user, wherein said plurality of information processing devices includes said information processing device;
controlling said information processing device to display an ongoing session of a game played between said first user and a second user,
wherein said ongoing session of said game is displayed based on said received view request;
controlling said information processing device to display a user interface (UI) element during said display of said ongoing session of said game,
wherein said UI element is selectable to view a gaming profile of said second user;
detecting, by said one or more circuits, an entry point event on said UI element during said display of said ongoing session of said game,
wherein said detected entry point event indicates a detection of an input of said first user on said information processing device;
generating, by said one or more circuits, context-aware gaming information of said second user based on user-activity information of said first user and said detected entry point event,
wherein said context-aware gaming information includes information of said second user in context of said game that is played by said second user with said first user in said ongoing session of said game; and controlling, by said one or more circuits, said information processing device for displaying said gaming profile of said second user and said generated context-aware gaming information, wherein said gaming profile of said second user is displayed based on selection of a tab, and wherein the tab is displayed along with said ongoing session of said game played between said first user and said second user.

12. The information processing method according to claim 11, further comprising extracting, by said one or more circuits, user-activity information of said first user from a storage device of said gaming server based on said received view request, wherein said user-activity information of said first user is extracted before said detection of said entry point event.

13. The information processing method according to claim 12, wherein said user-activity information of said first user corresponds to at least one of an in-game related action, a now playing-related action, a game related action, a shared media-related action, a friend-related action, or a community-related action.

14. The information processing method according to claim 12, wherein said entry point event corresponds to said UI element.

15. The information processing method according to claim 11, further comprising extracting, by said one or more circuits, contextual information from said gaming profile for said generation of said context-aware gaming information.

16. The information processing method according to claim 15, further comprising extracting, by said one or more circuits, said contextual information from said gaming profile of said second user based on said detected entry point event.

17. The information processing method according to claim 16, wherein said extracted contextual information comprises at least one of an overview of said gaming profile of said second user, at least one game played by said second user, at least one gaming achievement of said second user, streaming media content shared by said first user and said second user, or at least one friend and community of said second user.

18. The information processing method according to claim 11, further comprising communicating, by said one or more circuits, said generated context-aware gaming information along with said gaming profile to said information processing device.

19. The information processing method according to claim 18, wherein said communicated context-aware gaming information and said gaming profile of said second user is displayed on a same UI on a display screen of said information processing device.

20. The information processing method according to claim 18, further comprising controlling, by said one or more circuits, a display screen of said information processing device to display said gaming profile of said second user, wherein said display screen of said information processing device is controlled based on said input of said first user on said information processing device.

* * * * *